United States Patent Office 2,868,258
Patented Jan. 13, 1959

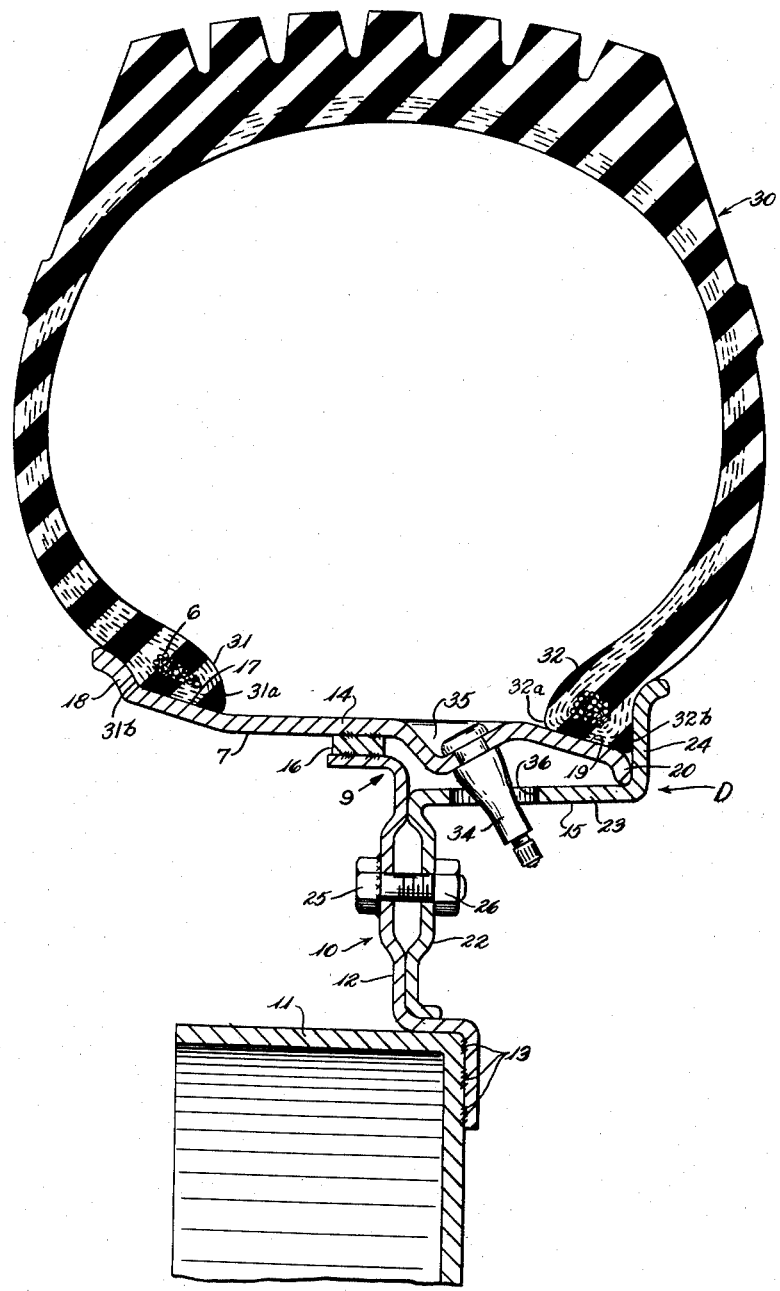

2,868,258

TUBELESS TIRE AND RIM THEREFOR

Robert Pope Powers, Akron, Ohio, assignor to The Firestone Tire & Rubber Company, Akron, Ohio, a corporation of Ohio Application December 14, 1956, Serial No. 628,295

9 Claims. (Cl. 152—362)

This invention relates to improved automobile rim constructions, and to tubeless tires adapted for use therewith.

At the present time, in order to dismount a tire and replace it with another, it is necessary for the motorist to remove a wheel from the car, because it is difficult to mount and dismount tires on drop center rims, which are now in general use, while the wheel is still in place on the vehicle. It is common practice, therefore, for the motorist to carry a spare tire mounted on a wheel in order to avoid changing a tire on the road. This extra wheel is heavy, expensive, and its handling is awkward for the average motorist.

The present invention is an improvement of the construction disclosed in my copending application Ser. No. 522,052 and relates to the combination of a two-piece rim and a tire having bead seats of different diameters and a tire with beads of different diameters. The larger diameter tire bead is mounted on a correspondingly large diameter rim bead seat and the smaller diameter tire bead is mounted on the smaller diameter rim bead seat and clamped thereagainst by a removable clamping ring portion of the said rim as will be understood from the description hereinafter.

An object of the present invention is to provide a rim and a tire adapted for use therewith of such construction that the tire may readily be mounted on the rim without removing a wheel, of which the rim is a part, from the vehicle.

Another object is to provide a rim so constructed that a tire may be mounted thereon and removed therefrom without distorting the tire beads.

Another object is to provide a multi-part rim and tubeless tire in which the rim bead seat diameters and tire bead diameters are correspondingly different, whereby the mounting of the tire on the rim is facilitated.

A further and more specific object is to provide a tubeless tire and rim each having different diameter beads and rim bead seats respectively, both of which beads and seats are inclined in the same direction, whereby both beads of the tire may easily be mounted on or demounted from the rim, without removing a wheel from the vehicle.

A still further object is to provide a rim, of the type designed to clamp a tire bead between portions thereof, which is so designed that close control of the width of a tire bead to be clamped is not necessary.

These and other objects and advantages will be more readily apparent from the following description of a preferred form of the invention, reference being had to the accompanying drawing, which shows in radial section a rim and a tire embodying the invention.

The present invention is described with reference to an assembly especially adapted for tubeless tires having relatively small diameter beads, such as 13 or 14 inches, although, of course, the size is not critical, and the construction will be as useful with tires and rims of any desired diameter.

It will be noted that whereas the bead seats of a conventional drop center rim slope in a converging direction toward the central portion of the rim base, both bead seats of the present invention are inclined in the same general direction toward the demounting side of the rim but preferably at different angles to the axis of the rim. By virtue of this feature, the larger diameter bead slides easily over the smaller diameter bead seat and along the base to continue onto its own bead seat, and the smaller diameter bead likewise is easily started up the incline on its own bead seat.

The small diameter bead is held in place by a separate and removable retaining ring. By this arrangement, a tire may quickly be mounted on and removed from the demounting side D of the rim and, as a result, a motorist need carry only a spare tire instead of being required to carry a spare wheel as well.

The wheel assembly embodying the invention is indicated generically as 10, and the rim thereof generically as 9. The rim 9 is shown affixed to a brake drum 11, which may be of conventional construction so long as it has the required structural strength. The rim is preferably secured to the brake drum by a radial flange or disc 12, which is spot-welded as indicated at 13 to the brake drum 11.

The rim 9 comprises rim portions 7 and 15. Rim portion 7 comprises a radially outwardly disposed side flange 18 which merges into a conical tire rim first bead seat 17 that slopes radially inwardly preferably at an angle of 20° to the axis of the rim. Said first bead seat in turn merges into a cylindrical axially extending rim base 14 whose edge portion opposite said outwardly disposed flange terminates in a second conical tire rim second bead seat 19 that also slopes radially inwardly, but preferably at an angle of 30° to the axis of the rim, the lateral outer edges of seat 19 being turned radially inwardly forming a shoulder-like edge 20. The other portion 15 of rim 9 is a retaining ring which comprises a rim flange 24, an inclined axial portion 23, and a radial portion 22, which is clamped to the radial supporting flange 12 by means of a plurality of circumferentially spaced bolts 25 fixedly secured to the flange as by welding, and by nuts 26 which engage the bolts.

In the present example, the bead seat 17 at the left of the rim has a nominal diameter of about 14.5 inches, and extends at an angle of about 20° to the axis of the wheel. The bead seat 19 at the right has a nominal diameter of approximately 13.5 inches, and extends at an angle of about 30° to the axis of rotation of the wheel. It should be noted, that the bead seats are both inclined in the same direction.

A tubeless open-bead type tire indicated generally at 30, is used with such a rim 9 and has the usual inextensible wire bead core 6 and tire beads of different diameters to correspond to the rim bead seat diameters. Thus the bead 31 shown at the left of the drawing, flares radially outwardly from its toe 31a to its heel 31b and it has a mean inside diameter of approximately 14.5 inches, which enables it to seat on the bead seat 17 with a tight compression fit; the right hand bead 32 flares radially outwardly from its toe 32a to its heel 32b and it has a mean inside diameter of approximately 13.5 inches, whereby it fits with a tight compression fit on its bead seat 19. Preferably the inside diameters of beads 31 and 32 comprise surfaces complementary to their respective bead seats 17 and 19; that is, the surfaces extend in generally the same direction as the seats and are such as to have a tight fit with the bead seats over a sufficient area to maintain a good airtight seal. Thus, as used herein, the term "complementary" means that the bead surfaces may extend at approximately the same angles as their bead seats but it can also include surfaces that extend at different angles but which still react with the bead seats so as to create a good seal, and the term "complementary" can also encompass surfaces which are rounded or which have other configurations but which will nevertheless make an adequate air-tight seal with corresponding bead seats.

The tire 30 is mounted on the rim by removing the nuts 26 and the retaining ring 15, and sliding bead 31 of the large diameter over the smaller diameter bead seat 19, along the rim base 14, and then up onto its bead seat 17. Thereafter the second, smaller diameter bead 32 is slid onto its smaller diameter bead seat 19, as far as the compression fit between bead and bead seat will allow. Finally, the retaining ring 15 is placed in position, and the nuts 26 are threaded tightly onto bolts 25 to draw the rim flange 24 into position against the edge 20 of the smaller diameter bead seat 19. It will be noted that the slightly conical portion 23 of the retaining ring assists in guiding and positioning the rim flange in relation to the bead seat edge.

It is an important feature of the present invention that the angularity of rim bead seat 19 is sufficiently abrupt to afford a clamping surface against the radially inner surface of tire bead 32 when flange 24 forces bead 32 laterally inwardly, and further, and of particular importance it is to be noted that the toe of bead 32 is free of lateral obstruction. As indicated above applicant has found a slope for seat 19 of 30° to the axis of the rim will provide the abruptness required to clamp inextensible bead 32 between seat 19 and flange 24. This freedom from lateral obstruction against the toe 32a obviates the requirement of accurate control of the tire bead width when tire 30 is built and molded. A novel feature of the present invention resides in bead 31 having lateral supports consisting of sloped bead seat 17 which provides a substantial portion of such support and a relatively low flange 18 which provides the remaining said lateral support of bead 31, while all the axially outwardly lateral support of bead 32 is provided by flange 24 of ring 15.

Inflationary pressure is introduced through a conventional inflation valve 34, preferably of the snap-in type, seated in a recessed portion 35 of the rim base 14 and extending conveniently through a hole 36 in the conical portion 23.

The removal of a tire from the rim is as convenient and quick as the assembly. After the pressure has been released from within the tire, the nuts 26 are removed, and the retaining ring 15 pulled away from the rim. Due to the direction of the bead seat inclination, the natural tendency will be for the smaller diameter bead to slip off the rim. It is also to be noted that inflationary air forces bead 31 against the inclined bead seat 17 and flange 24 forces bead 32 against its rim seat 19. This results in a distortion or stretching of said beads and when the pressing force is released as when the tire is to be demounted, the beads tend to recover their molded shape which usually results in breaking the beads loose from the metal of the rim. Where, however, prolonged service has caused the beads to become very firmly seated, easy demounting from seat 19 may be effected by introducing a small amount of inflationary air through the valve 34, to help in forcing the smaller diameter bead off its seat.

The use of bead seats which are inclined in the same direction thus makes it possible to mount and demount the bead 32 easily.

Due to the fact that the smaller diameter bead is pushed onto its bead seat by the retaining ring, the bead may be constructed for the necessary compression fit as demanded by good design; a good seal is thus effected and bead movement is reduced, resulting in less bead chafing.

Both beads 31 and 32 may be of the same construction and fabricated before molding in the usual manner of tire construction of bead portions of conventional tires. Applicant has found that such convention tire bead construction is satisfactory when the said bead portions are molded and vulcanized to the shape described above. It is to be understood, however, that the invention contemplates any arrangement of material at the tire bead porions 31 and 32 that may be found satisfactory.

A further advantage of the present invention is the taper of the axial portion of the retaining ring, which serves to guide and locate the ring in respect to the edge of the smaller diameter bead seat. In addition, improved support is provided by cooperation between the edge of the bead seat and the retaining ring.

A further and important advantage of the present invention resides in the firm attachment of the outboard bead to its bead seat. When an automobile turns a corner at too high speed the axially outer or outboard tire bead is subjected to severe force that tends to and in extreme cases does loosen the axially outer or outboard bead from its rim bead seat. This has been a problem with tubeless tires now in common use. Applicant's outboard beads are clamped so firmly onto their seats that "cornering" cannot displace them and this particular problem of the industry is solved.

The dtailed description of the particular embodiment of the invention illustrated and described here is not to be construed as limiting the invention thereto. The invention includes all features of patentable novelty residing in the foregoing description and the accompanying drawing.

I claim:

1. An open-beaded pneumatic tubeless tire comprising a tread and sidewalls, said sidewalls terminating respectively in substantially inextensible beads, each of said beads having a rim-contacting surface bounded by a heel portion at the outer edge of said surface and a toe portion at the inner edge of said surface, said rim-contacting surfaces being molded in frusto-conical form, one of said rim-contacting surfaces flaring outwardly in diameter at a substantial angle to the rolling axis of said tire from the toe portion to the heel portion thereof and the second of said rim-contacting surfaces flaring outwardly in diameter at a substantial angle to the rolling axis of said tire from the heel portion to the toe portion thereof and the second of said surfaces being substantially smaller in mean diameter than said first-mentioned surface.

2. An open-beaded pneumatic tubeless tire comprising a tread and sidewalls, said sidewalls terminating respectively in substantially inextensible beads, each of said beads having a rim-contacting surface bounded by a heel portion at the outer edge of said surface and a toe portion at the inner edge of said surface, said rim-contacting surfaces being molded in frusto-conical form, one of said rim-contacting surfaces flaring outwardly in diameter from the toe portion to the heel portion thereof at an angle of at least 15° to the rolling axis of said tire and the second of said surfaces flaring outwardly in diameter from the heel portion to the toe portion thereof at an angle of at least 15° to said tire axis and the second of said surfaces being substantially smaller in mean diameter than said first-mentioned surface.

3. A wheel assembly comprising in combination, a rim and a pneumatic tubeless tire of the open-beaded type having sidewall portions terminating respectively in substantially inextensible, inner and outer tire beads, said rim comprising an axially extending base portion terminating at its laterally inward edge in an inner bead seat comprising a frusto-conical surface flaring radially outwardly away from said base at a substantial angle and providing a tight compression-fit support for a complementary surface of said inner tire bead, said base portion terminating at its laterally outer edge in an outer bead seat comprising a frusto-conical surface converging radially inwardly away from said base at a substantial angle and providing a tight compression-fit support for a complementary surface of said outer tire bead, said outer bead seat having a mean diameter substantially smaller than the mean diameter of said inner bead seat, a clamping ring member and means to detachably secure said ring member to said rim and to draw said ring member against said outer tire bead, said ring member having a radial flange portion engaging and clamping said outer tire bead forcibly against said outer bead seat providing an air-tight seal between said base and said ring member to retain air within the chamber formed by said tire and said rim.

4. A wheel assembly comprising in combination, a rim and a pneumatic tubeless tire of the open-beaded type having sidewall portions terminating respectively in substantially inextensible inner and outer tire beads, said rim comprising an axially extending base portion terminating at its laterally inward edge in an inner bead seat comprising a frusto-conical surface flaring radially outwardly away from said base at an angle of at least 15° to the axis of said wheel and providing a tight compression fit-support for a complementary surface of said inner tire bead, said base portion terminating at its laterally outer edge in an outer bead seat comprising a frusto-conical surface converging radially inwardly away from said base at an angle of at least 15° to the axis of said wheel and providing a tight compression-fit support for a complementary surface of said outer tire bead, said outer bead seat having a mean diameter substantially smaller than the mean diameter of said inner bead seat, a clamping ring member and means to detachably secure said ring member to said rim and to draw said ring member against said outer tire bead, said ring member having a radial flange portion engaging and clamping said outer tire bead forcibly against said outer bead seat providing an air-tight seal between said base and said ring member to retain air within the chamber formed by said tire and said rim.

5. A wheel assembly comprising in combination, a rim and a pneumatic tubeless tire of the open-beaded type having sidewall portions terminating respectively in substantially inextensible inner and outer tire beads, said rim comprising an axially extending base portion terminating at its laterally inward edge in an inner bead seat comprising a frusto-conical surface flaring radially outwardly away from said base at an angle of about 20° to the axis of said wheel and providing a tight compression fit-support for a complementary surface of said inner tire bead, said base portion terminating at its laterally outer edge in an outer bead seat comprising a frusto-conical surface converging radially inwardly away from said base at an angle of about 30° to the axis of said wheel and providing a tight compression-fit support for a complementary surface of said outer tire bead, said outer bead seat having a mean diameter substantially smaller than the mean diameter of said inner bead seat, a clamping ring member and means to detachably secure said ring member to said rim and to draw said ring member against said outer tire bead, said ring member having a radial flange portion engaging and clamping said outer tire bead forcibly against said outer bead seat providing an air-tight seal between said base and said ring member to retain air within the chamber formed by said tire and said rim.

6. A rim for a pneumatic tubeless tire of the open-beaded type, said rim comprising an axially extending base portion terminating at its laterally inward edge in a bead seat comprising a frusto-conical surface flaring radially outwardly away from said base at a substantial angle to the axis of said rim, said base portion terminating at its laterally outer edge in a second bead seat comprising a frusto-conical surface converging radially inwardly away from said base at a substantial angle to said axis, said outer bead seat having a mean diameter substantially smaller than the mean diameter of said inner bead seat, a clamping ring member and means to detachably secure said ring member to said rim and to draw said ring member axially inwardly toward said outer bead seat.

7. A rim for a pneumatic tubeless tire of the open-beaded type, said rim comprising an axially extending base portion terminating at its laterally inward edge in a bead seat comprising a frusto-conical surface flaring radially outwardly away from said base at an angle of at least 15° to the axis of said rim, said base portion terminating at its laterally outer edge in a second bead seat comprising a frusto-conical surface converging radially inwardly away from said base at an angle of at least 15° to said axis, said outer bead seat having a mean diameter substantially smaller than the mean diameter of said inner bead seat, a clamping ring member and means to detachably secure said ring member to said rim and to draw said ring member axially inwardly toward said outer bead seat.

8. A rim for a pneumatic tubeless tire of the open-beaded type, said rim comprising an axially extending base portion terminating at its laterally inward edge in a bead seat comprising a frusto-conical surface flaring radially outwardly away from said base at an angle of about 20° to the axis of said rim, said base portion terminating at its laterally outer edge in a second bead seat comprising a frusto-conical surface converging radially inwardly away from said base at an angle of about 30° to said axis, said outer bead seat having a mean diameter substantially smaller than the mean diameter of said inner bead seat, a clamping ring member and means to detachably secure said ring member to said rim and to draw said ring member axially inwardly toward said outer bead seat.

9. An open-beaded pneumatic tubeless tire comprising a tread and sidewalls, said sidewalls terminating respectively in substantially inextensible beads, each of said beads having a rim-contacting surface bounded by a heel portion at the outer edge of said surface and a toe portion at the inner edge of said surface, said rim-contacting surfaces being molded in frusto-conical form, one of said rim-contacting surfaces flaring outwardly in diameter from the toe portion to the heel portion thereof at an angle of about 20° to the rolling axis of said tire and the second of said surfaces flaring outwardly in diameter from the heel portion to the toe portion thereof at an angle of about 30° to said tire axis and the second of said surfaces being substantially smaller in mean diameter than said first-mentioned surface.

References Cited in the file of this patent

UNITED STATES PATENTS

| 1,739,370 | Moulton | Dec. 10, 1929 |
| 2,817,381 | Powers | Dec. 24, 1957 |

FOREIGN PATENTS

| 378,688 | Great Britain | Aug. 18, 1932 |
| 756,655 | France | Sept. 25, 1933 |